W. M. GREENWOOD & J. N. CLARKE.

Horseshoe Blank Bars.

No. 8,506. Reissued Nov. 26, 1878.

Attest
Walter Knight
Harry C. Knight

Inventor
William M. Greenwood
John N. Clarke
By Knight Bros., Attys.

N. PETERS, PHOTO-LITHOGRAPHER, WASHINGTON, D. C.

UNITED STATES PATENT OFFICE.

WILLIAM M. GREENWOOD AND JOHN N. CLARKE, OF CINCINNATI, OHIO.

IMPROVEMENT IN HORSESHOE-BLANK BARS.

Specification forming part of Letters Patent No. 167,096, dated August 24, 1875; Reissue No. 8,506, dated November 26, 1878; application filed September 28, 1878.

DIVISION B.

*To all whom it may concern:*

Be it known that we, WILLIAM M. GREENWOOD and JOHN N. CLARKE, both of Cincinnati, Hamilton county, Ohio, have invented a new and useful Improvement in Horseshoe-Blanks, of which the following is a specification:

This invention relates to a blank or bar for a form of horseshoe having some features in common with that patented to said CLARKE on the 10th July, 1866, No. 56,181, and is designed to be manufactured by rolls of our invention described in reissue, Division A, of our patent for rolls for manufacturing horseshoe-blanks, originally dated 24th August, 1875, and numbered 167,096.

In the present improvement only so much of the transversely-notched ridge of the original Clarke shoe is retained as to occupy a portion of the width of the sole, which, between such ridge and the outermost margin, has a groove or fullering designed to receive the nail-holes, and which enables the holes to be located at any desired part of the circuit of the shoe to suit the animal's hoof.

The ridge or marginal rim outside of the fullering imparts longitudinal rigidity, and, being less protuberant than the indented ridge, diminishes the liability to interference, and at the same time enables a more rapid gait.

Figure 1:
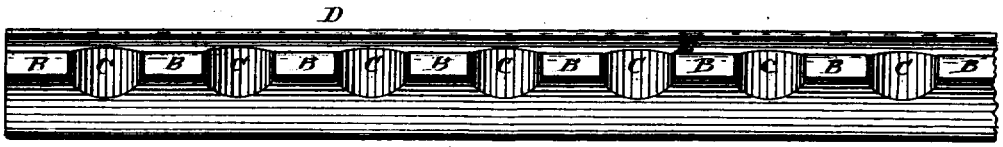
Figure 2:
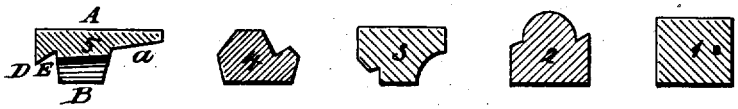
Figure 3:
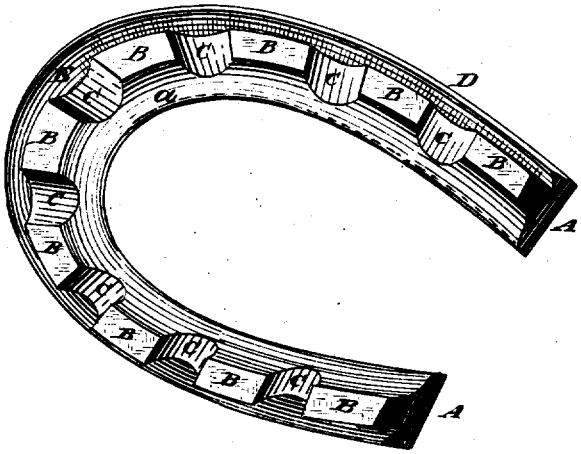

In the accompanying drawings, Figure 1 represents, by an under-side plan view, a piece of shoe-blank embodying the more essential features of our invention. Fig. 2 consists of sectional views indicative of the forms assumed by the bar in its successive passes. Fig. 3 is an inverted perspective view of a shoe formed from a fragment of one of our blanks.

A represents the principal web or plate portion, forming the upper side of the shoe when in use.

Occupying the midwidth of the tread or sole side of the blank is a notched or indented ridge, constituted by a series of protuberances, B, and intervening indentations C.

The extreme outer margin of the sole is formed by a continuous ridge, D, which does not project so far downward as the protuberances B, and is separated from them by a groove or fullering, E, in which the farrier may make the nail-holes in such number and locations as may in his judgment best suit the particular hoof to be treated.

The sole of our blank decreases in thickness from its corrugated mid-ridge, so as to constitute a thin fin or marginal web, *a*. This fin or web is formed wholly or mainly in the last pass, and consists, in part, of metal displaced from the central ridge by the indenting-roll.

Our improved blank is gradually brought to the desired form in rolls, such as described in our Division A aforesaid, by a succession of passes, of proper number and shapes—such, for example, as indicated at 1, 2, 3, 4, and 5, Fig. 2.

Our improved blank is first produced in the straight form by means of suitably-shaped rolls, such as described in Division A of our said reissued patent, and these blanks being cut into proper lengths, each length is bent to the desired shape, either in the place of original manufacture or by the farrier, and is modified by the latter in any way he may deem desirable.

The blank may be imperforate, as shown, or may be perforated with nail-holes; and its upper surface may be in one plane, as shown, or of any customary or desired bevel.

Among decided advantages of our improvement we may cite the following:

Coupled with sufficient irregularity of tread to prevent slippage, there is secured a practically level bearing for the foot, and hence there can occur no such depression on either side as to strain the animal's tendons.

The deep fullering enables the utilization of the strongest part of the shoe-nail, and, in association with the relatively greater protuberance of the indented ridge, effectually guards the nails from such contact with the ground as to drive them too deeply into the hoof and loosen the clinches.

The marginal ridge outside the fuller-groove serves to brace and stiffen the transversely-indented portions of the shoe, which would otherwise be too weak.

We claim as new and of our invention—

A horseshoe-blank having a continuous or flat upper surface and an under surface consisting of an external fullered ridge, a more protuberant middle portion, transversely indented, and an inclined or tapering inner margin, formed by the displacement of the metal from the protuberant portion in forming and indenting the central ridge, all substantially as herein set forth.

In testimony of which invention we hereunto set our hand.

WILLIAM M. GREENWOOD.
JOHN N. CLARKE.

Witnesses:
GEO. H. KNIGHT,
HARRY E. KNIGHT.